Dec. 6, 1955         W. C. DUNLAP, JR         2,726,312
THERMAL CONTROL SYSTEM
Filed Jan. 17, 1952         2 Sheets-Sheet 1
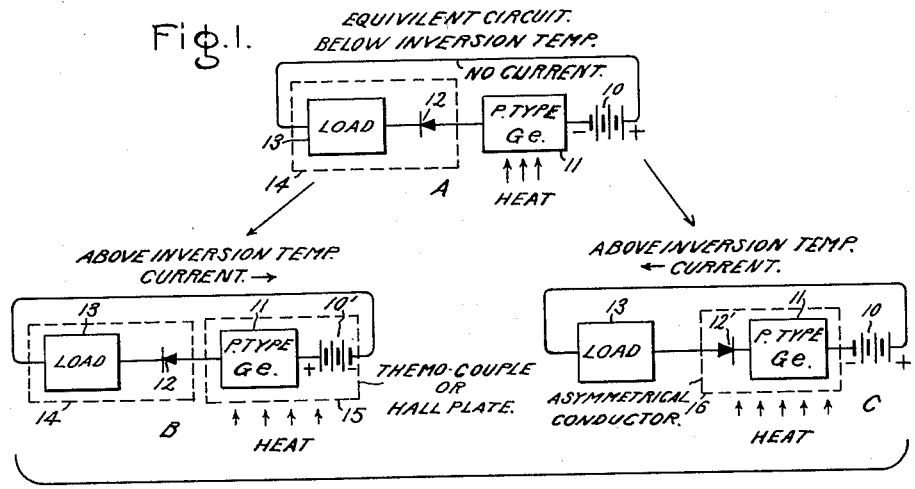
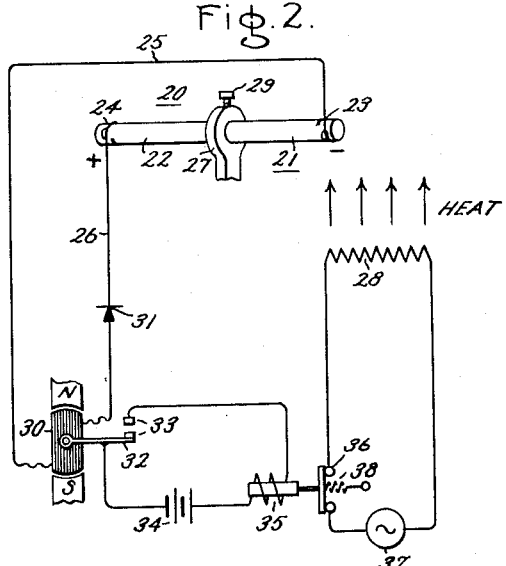
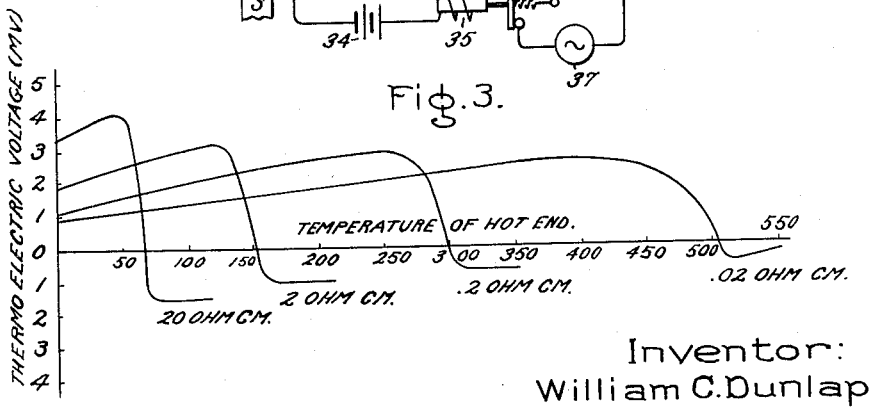
Inventor:
William C. Dunlap, Jr
by Paul A. Frank
His Attorney

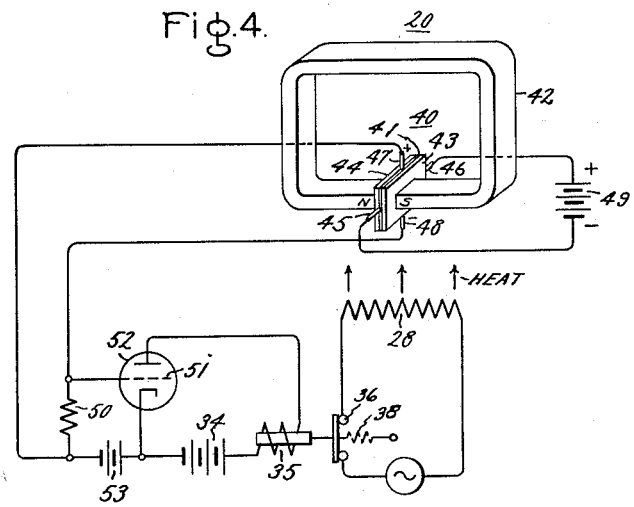
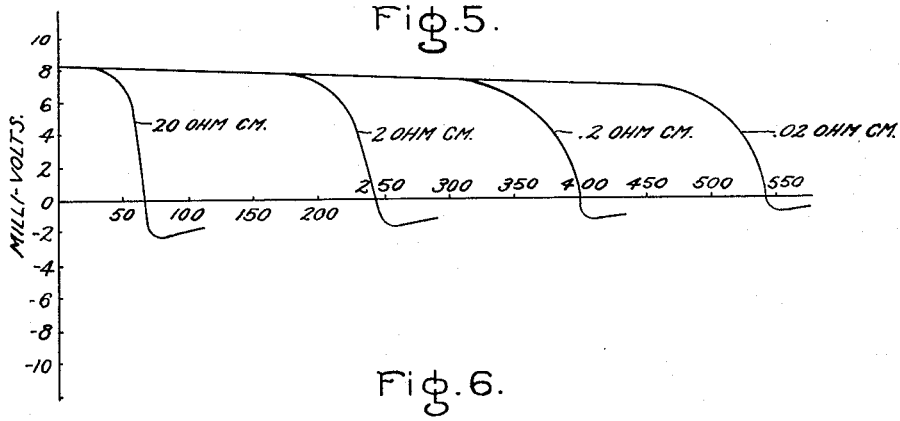
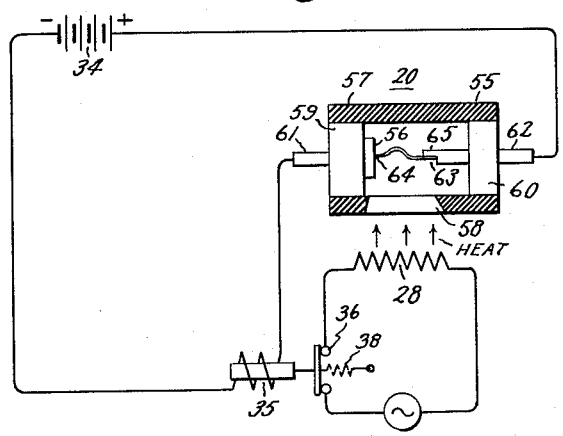
Inventor:
William C. Dunlap, Jr.
by Paul A. Frank
His Attorney.

United States Patent Office 2,726,312
Patented Dec. 6, 1955

2,726,312
THERMAL CONTROL SYSTEM

William C. Dunlap, Jr., Schenectady, N. Y., assignor to General Electric Company, a corporation of New York Application January 17, 1952, Serial No. 266,910

19 Claims. (Cl. 219—20)

My invention relates to thermoresponsive apparatus and more particularly to thermal control systems utilizing thermosensitive elements capable of developing or modifying an output voltage or current in accord with temperature changes in the element.

Thermal control systems are usually employed to measure, monitor or regulate the destined operating temperature or temperature range of various types of industrial apparatus. The thermosensitive elements employed in such thermal control systems generally are either of a "thermoelectric" type, such as thermocouples, which generate a voltage in accord with their temperature; or of a thermoresponsive resistance or "thermoconductive" type, such as thermistors, whose conductivity varies in accord with their temperature. The electrical output of such conventional thermosensitive elements represents the sensed temperatures only in the relative magnitude of this output, and do not provide an absolute positive indication that a predetermined elevated temperature has been reached or exceeded.

Moreover, the customary thermoelectric elements suffer serious limitations in their field of applicability. They generally develop only very small voltages, less than 2 millivolts at temperature differences below 250° C. and require that a portion of the thermoelectric element be considerably removed from the heat source and be maintained at a fairly constant low temperature in order that the generated thermoelectric voltage may be of perceptible magnitude and may accurately reflect the temperature of a heated portion of the element.

Accordingly, an important object of the invention is to provide a thermal control system which utilizes a thermosensitive element inherently providing a positive and absolute indication of the attainment of a predetermined elevated temperature as well as an inherent absolute indication whether its operating temperature is above or below this predetermined temperature.

In fulfillment of the foregoing object, it is another object of the invention to provide a thermal control system which does not depend primarily upon the relative magnitude of thermoresponsive voltages or currents produced therein, but rather depends primarily upon the polarity or direction of such voltages or currents.

Another object of the invention is to provide a polarity-sensitive thermal control system which utilizes thermosensitive elements of either the thermoelectric or thermoconductive type.

An additional object of the invention is to provide a polarity-sensitive thermal control system which may be employed with electrical loads responsive to electricity of both positive and negative polarity or with electrical load devices responsive to electricity of one predetermined polarity only.

One embodiment of the invention employs a thermosensitive element of the thermoelectric type, and it is a further object of this embodiment to provide a thermal control system in which the entire thermoelectric element may be mounted within the influence of the heat source with only a slight temperature gradient along one dimension thereof. A still further object of this embodiment is to provide a thermoelectric element capable of generating voltages of the order of 4 millivolts with themperature differences as low as 10 degrees centigrade.

In general, the invention is based upon an advantageous utilization of the unusual properties of positive or "P-type" germanium, i. e., germanium having an excess of electron vacancies in its atomic lattice structure, which vacancies may be produced by the presence of minute traces of electron-absorbing impurities, commonly called "acceptor" impurities. Aluminum, gallium and indium are examples of such "acceptor" impurities for germanium. Such P-type germanium has been found to exhibit "intrinsic" germanium characteristics at temperatures above a predetermined elevated temperature herein referred to as the "inversion temperature" of the germanium. "Intrinsic" germanium is germanium substantially free of significant impurities so as to be considered pure germanium. Germanium, for example, having room temperature bulk resitivity in the neighborhood of 50 ohm centimeters may be considered intrinsic germanium. As is well known, germanium is a semiconductor and possesses certain electrical control characteristics, for example, thermoelectric characteristics, Hall effect characteristics, and asymmetrically conductive characteristics; and germanium members are therefore employed as thermocouples, Hall plates and rectifiers. What is important for the present application is that the electrical control characteristics of P-type germanium have a polarity opposite to that of intrinsic germanium. In other words, the direction of current rectification and the polarity of generated thermoelectric or Hall effect voltages produced with P-type germanium members are directly opposite to that produced with intrinsic germanium members.

The reason for these unusual properties of P-type germanium is evidently that below the inversion temperature the acceptor impurities within the germanium primarily determine the electrical characteristics of the germanium member while at temperatures above the inversion temperature, the impurities have little or no effect so that the germanium member has the properties of substantially pure germanium.

In accord with the invention, electricity generating means comprising a thermosensitive element including a P-type germanium member is connected in circuit relation with an electrical load desired to be temperature controlled. As the temperature of the P-type germanium member increases, a temperature is reached at which the germanium member changes from P-type to intrinsic type with a corresponding change in the polarity of its electrical control characteristic. As a consequence, electricity of one polarity is supplied to the load when the temperature of the germanium member is below this "inversion temperature" and of an opposite polarity when the temperature of the germanium member is above this inversion temperature. If the load is of the type responsive both to positive and negative polarity electricity, asymmetrically conducting means is included in the load circuit to enable energization of the load only when the temperature of the germanium member is in a predetermined desired direction above or below this inversion temperature. If the load device is of the type responsive to unidirectional electricity of one polarity only, i. e., is "polarity-sensitive," no such auxiliary asymmetrically conducting means need be included.

The germanium thermosensitive element included in the control system of the invention may conveniently have one of three general constructions corresponding to and taking advantage of either the thermoelectric, Hall effect, or asymmetrically conductive control characteristics of germanium. In the thermoelectric construction, the thermosensitive element comprises an elongated rod of P-type germanium having thermocouple junctions at each end. In the "Hall effect" construction, the thermosensitive element comprises a thin P-type germanium "Hall plate" and means for passing a magnetic field perpendicularly through the thickness of the Hall plate. In the asymmetrically conductive construction, the thermosensitive element comprises a member of P-type germanium and a metal electrode making substantially punctiform contact with a surface of the germanium member. The thermoelectric type element generates electrical energy and thus requires no auxiliary source of current; but the asymmetrically conductive and Hall effect type thermosensitive elements are in the nature of thermoconductive devices which do require auxiliary current sources. Both the thermoelectric and Hall effect type thermosensitive elements usually require additional unidirectional conducting means if a non-polarity-sensitive load is to be energized, but the asymmetrically conductive type thermosensitive element inherently includes such unidirectional conducting means.

Any desired inversion temperature between 50 and 700° C. may be achieved by selecting P-type germanium inherently having the requisite impurity content or by controlling the amount of significant acceptor impurities in the germanium during its reduction to crystalline form. As is well known in the art, the room temperature resistivity of germanium is a fairly accurate indication of the concentration of significant impurities within the germanium. P-type germanium having a room temperature resistivity of the order of 20 ohm centimeters has only minute traces of such significant acceptor impurities, while P-type germanium having room temperature resistivity of the order of .002 ohm centimeter has definitely discernible amounts of such impurities. It will be appreciated, of course, that in any case the amount of impurities present in the germanium member must be extremely small, considerably less than 1%. Impurity concentrations, for example, of the order of 1 part per million may have considerable effect upon the electrical control characteristics of the germanium member.

The novel features which are believed characteristic of the invention are set forth in the appended claims. The invention itself, however, together with further objects and advantages thereof can best be understood by reference to the following description taken in connection with the accompanying drawings in which Fig. 1 is a group of schematic circuit diagrams illustrative of the operation of various embodiments of the thermal control system of the invention at temperatures above and below the inversion temperature of the germanium member included therein; Fig. 2 is a circuit diagram of a heat regulating system incorporating an embodiment of the thermal control system of the invention which utilizes a thermosensitive element of the thermocouple type; Fig. 3 is a family of curves showing typical generated thermoelectric voltages as a function of temperature for germanium thermocouple members having different room temperature resistivities; Fig. 4 is a schematic circuit diagram of a heat regulating system incorporating another embodiment of the thermal control system of the invention which utilizes a thermosensitive element of the Hall effect type; Fig. 5 is a family of curves showing generated Hall effect voltages as a function of temperature for Hall plates having different room temperature resistivities; and Fig. 6 is a schematic circuit diagram of a heat regulating system incorporating still another embodiment of the thermal control system of the invention which utilizes a thermosensitive element of the asymmetrically conductive type.

Referring to Fig. 1, there are shown three simplified circuit diagrams illustrating various forms of the invention at temperatures above and below the inversion temperature of the germanium member included therein. The circuit diagram designated by letter A shows the basic components and connections of the invention under conditions where no energization of the load is desired at temperatures below the inversion temperature. These basic components are an electricity generating means including a voltage source 10 and a P-type germanium member 11 connected in series with an asymmetrical conductor shown as a rectifier 12, and an electrical load 13. Load 13 and rectifier 12 comprise a polarity-sensitive load circuit 14 and may be replaced by any polarity-sensitive load device, in which case rectifier 12 may not be necessary since the polarity discriminating function of the rectifier is often inherent in the operation of such polarity-sensitive load devices. Where it is desired that no energization of the load occur at temperatures below the inversion temperature of germanium member 11, the polarity of the electricity generating means is made opposite to the polarity sensitivity of load 14 or to the polarity of rectifier 12 incorporated therein, with the result that substantially no current flows in the thermal control circuit at these temperatures.

As the temperature of the P-type germanium member 11 is increased above its inversion temperature, the equivalent circuit diagram changes to that illustrated by diagram B or C depending upon the type of thermosensitive element employed in the thermal control system. Circuit diagram B illustrates the change that takes place when the P-type germanium member 11 is in the form of a thermocouple or Hall plate, while circuit diagram C illustrates the change that takes place when the P-type germanium member 11 is in the form of an asymmetrically conductive device. When the germanium member 11 is in the form of a thermocouple or Hall plate, the germanium member 11 actually constitutes a portion of the electricity generating means as indicated in diagram B by its enclosure together with voltage source 10' within dashed line 15. As the germanium member is heated above its inversion temperature, the polarity of the generated thermoelectric or Hall effect voltage reverses so as to have a proper energizing polarity for the polarity-sensitive load 14.

When the germanium member 11 is incorporated in an asymmetrically conductive device, the member 11 no longer includes the function of voltage source 10 but rather includes the function of rectifier 12, as indicated in diagram C by its enclosure together with rectifier 12' within dashed line 16.

When the asymmetrically conductive device 16 is raised above its inversion temperature, the direction of rectification reverses as illustrated by the polarity of rectifier 12' so that current from voltage source 10 is no longer blocked and flows through load 13. It will be appreciated that in the embodiment of the invention represented by diagram C, load 13 may be polarity sensitive in a direction coinciding with the easy flow direction of rectifier 12' or may be non-polarity-sensitive since no load current flows when the direction of rectification of asymmetrically conductive device 16 has a temperature below its inversion temperature. If it is desired to energize load 13 at temperatures below the inversion temperature and to de-energize load 13 at temperatures above the inversion temperature, it is only necessary to reverse the polarity of rectifiers 12 and 12' or to reverse the polarity of the voltage source 10 in each of the circuit diagrams A, B, and C.

The specific construction and details of operation of the various embodiments illustrated by the simplified schematic diagrams A, B and C of Fig. 1 may be easily understood by reference to Figs. 2 through 6.

Referring to Fig. 2, I have shown a heat regulating system embodying the invention which employs a thermosensitive element 20 in the form of a thermocouple 21. Thermocouple 21 constitutes an elongated P-type germanium member designated as rod 22 having thermocouple junctions 23 and 24 at either end. Junctions 23 and 24 may conveniently be formed by connecting suitable electric conductors 25 and 26 by means of silver or lead solder to the respective ends of rod 22. Conductors 25 and 26 may be conventional copper wire. Rod 22 is supported by any suitable heat-resistant insulating means, such as ceramic collar 27, to have one thermocouple junction 23 in a location receiving heat directly from a heating means such as a resistive heating element 28. The other thermocouple junction, such as junction 24, may also be within the influence of heat source 28 but is slightly further removed from source 28 than thermocouple junction 23 in order that a slight temperature difference more than 5° C. and preferably in the neighborhood of 20° C. continually exists between the ends of rod 22 regardless of the absolute temperature of source 28. The proximity of the entire germanium rod 22 to heat source 28 is preferably made adjustable by making rod 22 a sliding fit within collar 27 positionable by set screw 29. Thermocouple 21 is connected in series with a polarity-sensitive load circuit comprising low current relay 30, preferably of the illustrated galvanometer type, and a unidirectional conducting means such as rectifier 31. Rectifier 31 is not absolutely necessary but is preferably included in order to prevent movement of a contact arm 32 of relay 30 in a non-contact making direction. Contacts 33 of relay 30 are connected in series with a current source 34 and an electromagnetic relay 35 that exerts considerably more contact actuating force than relay 30. Relay 35 is arranged to open higher current carrying contacts 36 connected in series with an electric power source 37 and heating element 28.

The operation of the heat regulating system of Fig. 2 may be easily understood by referring to the curves of Fig. 3 which illustrate typical generated thermoelectric voltages as a function of the temperature of the hotter thermocouple junction 23 for different thermocouples comprising P-type germanium having different room temperature resistivities. The curves of Fig. 3 all assume a 10° C. temperature difference between hot junction 23 and colder junction 24. As can be seen from the curves, the higher resistivity P-type germanium has a lower inversion temperature than lower resistivity P-type germanium. Each of the represented thermocouples produce fairly constant thermoelectric voltages of positive polarity until temperatures in the neighborhood of the inversion temperature is reached, whereupon the generated thermoelectric voltage rapidly decreases, passes through zero and increases again in an opposite direction as the P-type germanium changes to germanium having intrinsic type characteristics. At room temperature, the thermoelectric voltages generated by high-resistivity germanium is in general slightly higher than that generated by lower-resistivity germanium; but once the temperature of the germanium member is raised above the inversion temperature so that it has intrinsic type characteristics, the generated thermoelectric voltages in the reverse direction are approximately the same for the same temperatures.

The practical range of thermocouple inversion temperatures has been found to be between 50 and 700° C., the 50° inversion temperature being achieved with P-type germanium of unusually high room temperature resistivity in the neighborhood of 40 ohm centimeters, and the 700° inversion temperature being achieved with P-type germanium having a room temperature resistivity in the neighborhood of .002 ohm centimeters.

In the operation of the heat regulating system of Fig. 2, a P-type germanium thermocouple 21 is selected having a thermocouple inversion temperature slightly below or equal to the temperature desired to be maintained in apparatus under the influence of heat source 28. Below the inversion temperature, the polarity of the generated thermoelectric voltage tends to produce current in the polarity-sensitive circuit including relay 30 and rectifier 31 in a direction opposite to the easy-flow direction of rectifier 31 with the result that no current flows. As the temperature of the thermocouple is raised above its inversion temperature, the polarity of the generated thermoelectric voltage reverses, as indicated by the curves of Fig. 3, and current flows through relay 30 in a proper direction to close contacts 33, and thereby to energize higher current relay 35 to open contacts 36 and extinguish the power supplied to heat source 28. The resultant cooling of thermocouple 21 through its inversion temperature again reverses the polarity of the generated thermoelectric voltage back to its initial polarity and de-energizes relay 30, opening contacts 33, de-energizing relay 35 and allowing contacts 36 to close under the force of spring 38. Heat regulation of heat source 28 or of apparatus under the influence of heat source 28 may thus be maintained.

Referring to Fig. 4, I have shown a heat regulating system similar to that of Fig. 2 but employing a thermosensitive element 20 of the Hall effect type instead of the thermocouple type, and also employing an electron discharge device as the electrical load rather than a galvanometer type relay. In Fig. 4, the thermosensitive element 20 comprises a Hall effect device 40 in which a Hall plate 41 comprising a P-type germanium is supported within a magnetic field generated between opposing poles N and S of a magnet 42, preferably of the permanently magnetized horseshoe-type illustrated. Hall plate 41 is preferably fairly thin, of the order of .050" and has non-critical length and width dimensions between 0.20" to 0.50", for example. Insulating dielectric plates 43 and 44 are interposed between Hall plate 41 and each of the pole faces of magnet 42 in order that Hall plate 41 may be directly supported by magnet 42. Input Hall electrodes 45 and 46 and output Hall electrodes 47 and 48 are secured by such means as a high temperature solder to opposite parallel edges of Hall plate 41. A unidirectional current source 49, preferably having low impedance, is connected to input Hall electrodes 45 and 46 to provide a current along one axis of Hall plate 41, and a grid return resistor 50 for discharge device 52 is connected between output Hall electrodes 47 and 48. Resistor 50 functions to couple the Hall effect output voltage of Hall plate 41 to a control electrode 51 of discharge device 52. Electromagnetic relay 35 is connected in the anode-to-cathode output circuit of discharge device 52, and the device 52 is biased by such means as battery 53 preferably to the conduction cutoff point; although for highly sensitive operation of relay 35, device 52 may be biased to pass sufficient output circuit current to hold relay 35 at the threshold of energization.

The output voltage in millivolts of Hall effect device 40 at any given temperature may be determined from the following expression:

$$E=\frac{RHI}{t}$$

where
R is a quality factor of the particular germanium sample customarily known as the "Hall coefficient";
H is the constant magnetic field in gauss;
I is the current in milliamperes; and
$t$ is the thickness of the Hall plate in inches.

As is well known in the field of Hall effect devices, an output voltage between Hall electrodes 47 and 48 of the order of 10 millivolts can easily be obtained.

In Fig. 5, typical output voltage curves as a function of temperature are shown for P-type germanium Hall plates having different room temperature resistivities. In taking these curves, the current supplied to each sample of different resistivity is initially adjusted to provide the same output voltage at room temperature. A comparison of the curves of Figs. 3 and 5 indicates that the inversion temperatures for Hall plates and thermocouples made from P-type germanium having similar room temperature resistivities are approximately the same, although the Hall plate inversion temperatures are somewhat higher than the thermocouple inversion temperatures in the temperature range between 150° and 600° C.

As illustrated by the curves of Fig. 5, the output Hall voltage of any given Hall plate for temperatures below the inversion temperature is fairly constant. This is a result of the fact that although the resistivity and the Hall coefficient of the germanium decreases with increasing temperature, their ratio, the mobility, remains fairly constant. Since in the above mathematical expression for output Hall voltage, the current I is inversely proportional to the resistivity of the germanium, the resulting current increase tends to compensate for the decrease in Hall coefficient, and the output voltage remains substantially independent of temperature except in the inversion temperature region where the Hall coefficient reverses sign in accord with the transformation from P-type to intrinsic type germanium.

In the operation of the apparatus of Fig. 4, Hall plate 41 is connected to supply to control electrode 51 of discharge device 52 at temperatures below its inversion temperature a voltage having a polarity to increase the negative bias voltage on device 52 and thus to have no energizing effect upon relay 35. As the temperature of plate 41 is raised by heat source 28 above its inversion temperature the output Hall effect voltage reverses polarity, and a positive voltage is supplied to control electrode 51. The current through discharge device 52 thereupon increases correspondingly and energizes relay 35 to disconnect the power supplied to heat source 28 in the same manner as heretofore explained in connection with the regulating system of Fig. 2.

Referring now to Fig. 6, I have shown a heat regulating system embodying the invention in which the thermosensitive element 20 comprises an asymmetrically conductive device instead of a thermoelectric device as in Fig. 2 or a Hall effect device as in Fig. 4. In Fig. 6, relay 35 is connected in series with the thermosensitive element 20 and the current source 34. The magnitude of current supplied by the electricity generating means comprising current source 34 and thermosensitive element 20 is large enough that no additional amplification stages, such as included in the apparatus of Fig. 2 and Fig. 4, is necessary in the apparatus of Fig. 6. Asymmetrically conductive thermosensitive element 20 is preferably in the form of a germanium point-contact rectifier 55 which employs a high resistivity P-type germanium wafer 56 as the effective element instead of the conventional N-type germanium wafer. Rectifier 55 may conveniently have a cylindrical insulating casing 57 with a heat admitting window 58 in a wall thereof. Conductive metal plugs 59 and 60 are secured within opposite ends of casing 57 and connected to suitable terminal conductors 61 and 62 respectively. P-type germanium wafer 56 is secured in good conductive relation with metal plug 59 by such means as a high temperature solder. A metal wire electrode 63, such as platinum or an alloy of platinum, has a pointed end 64 making substantially punctiform contact with the surface of wafer 56. The other end of wire electrode 63 is connected by any suitable means such as soldering or spot welding to a lip 65 on terminal conductor 62. The point contacting surface of germanium wafer 56 may be polished and etched in accord with known techniques in order to improve the rectification characteristics of rectifier 55.

In the operation of the heat regulating system of Fig. 6, rectifier 55 is connected in circuit relation with relay 35 and current source 34 with a proper polarity to block current through relay 35 at room temperatures. As germanium wafer 56 is heated from source 28 to temperatures above the rectification inversion temperature of the wafer, the direction of rectification provided by rectifier 55 reverses such that current thereupon passes easily through the rectifier and energizes relay 35. This embodiment of the invention, however, is useful only with temperatures below 200° C. since the rectifying properties of germanium substantially disappear at temperatures above 200° C. Moreover, a sharp line of demarcation between current blocking at temperatures below the inversion temperature and easy current passage at temperatures above the inversion temperature occurs only when the rectifier 55 has good rectification characteristics at room temperature; i. e., utilizes a P-type germanium member of fairly high resistivity in the neighborhood of 2 to 40 ohm centimeters. A very positive control action, however, can be achieved in the temperature range between 50° and 150° C. by employing P-type germanium contact rectifiers in which the room temperature resistivity of the included germanium element is between 2 and 40 ohm centimeters as mentioned above.

The P-type germanium member, such as rod 22, Hall plate 41, or wafer 56, included in the thermosensitive elements 20 of Figs. 2, 4 and 6 may be produced in accord with any of the known techniques for preparing germanium having a predetermined desired impurity content. One convenient method of making such P-type germanium members of desired resistivity is to prepare germanium ingots of considerably higher purity than ultimately desired and then to melt this ingot and introduce controlled minute amounts of an acceptor impurity such as indium, aluminum, or gallium, into the melt. Upon cooling, the ingot has P-type germanium characteristics and a lower resistivity depending upon the amount of acceptor impurity introduced into the melt. P-type members adapted for use in the invention may then be cut from the wafer by such means as a diamond saw. The amount of acceptor impurity necessary to produce germanium approximating any desired resistivity can be discovered by a few preliminary tests utilizing small samples of the highly purified germanium ingot.

It will be thus seen that I have provided a thermal control system that has a positive and absolute control action at a predetermined temperature corresponding to an inversion temperature of an included P-type germanium member. Although in Figs. 2, 4 and 6, I have shown the invention in conjunction with heat regulating apparatus, the thermal control system of the invention may also be utilized to control the energization of any electrical load in accordance with the temperature of the heat source. Any electrical device may be energized or de-energized at temperatures in either direction from the inversion temperature of the included P-type germanium member by merely connecting the electrical device in proper polarity relationship with the electricity generating means including the P-type germanium member. Moreover, although I have described the invention in connection with unidirectional voltage sources and electrical loads responsive to substantially constant unidirectional currents and voltages, it will be appreciated that the invention may be used with alternating voltage sources and with electrical loads responsive to the unidirectional components of such alternating voltages generated by the control system of the invention. It is also to be understood that although I have shown particular embodiments of the invention, many modifications can be made, and I intend by the appended claims to cover all such modifications as fall within the true spirit and scope of the invention.

What I claim as new and desire to secure by Letters Patent of the United States is:

1. A thermal control system comprising an electrical load, electricity generating means connected to said load comprising a thermosensitive element adapted to be heated by an external heat source and including a P-type germanium member having an electrical control characteristic of one polarity at room temperature and of an opposite polarity at temperatures above an elevated temperature, said thermosensitive element being connected in circuit with said load to control the polarity of electricity supplied to said load in accord with the polarity of said control characteristic of said member, and means responsive to said load for controlling said heat source.

2. A thermal control system comprising an electrical load responsive to electricity of one polarity only, electricity generating means connected to said load comprising a thermosensitive element adapted to be heated by an external heat source including a germanium member having a P-type germanium control characteristic of one polarity at temperatures below a predetermined inversion temperature and having an intrinsic type germanium control characteristic of opposite polarity at temperatures above said inversion temperature, said germanium member being connected in circuit with said load to control the polarity of electricity supplied to said load in accord with said control characteristic of said member, and means responsive to said load for controlling said heat source.

3. A thermal control system comprising an electrical load responsive to electricity of one polarity only, electricity generating means connected to said load including a P-type germanium member having an electrical control characteristic of one polarity at temperatures below an elevated inversion temperature and of an opposite polarity at temperatures above said inversion temperature, said germanium member being connected in circuit with said load to control the polarity of electricity supplied to said load in accord with said control characteristic, and means responsive to said load for heating at least a portion of said member.

4. A thermal control system comprising an electrical load, electricity generating means connected to said load comprising a thermosensitive element adapted to be heated by an external heat source including a germanium member having a positive type germanium control characteristic at temperatures below a predetermined inversion temperature and having an intrinsic type germanium control characteristic at temperatures above said inversion temperature, said electricity generating means providing electricity having one polarity when said member has said positive type characteristic and having an opposite polarity when said member has said intrinsic type characteristics, unidirectional conducting means in circuit relation with said load and said electricity generating means to supply to said load electricity having one polarity only, and means responsive to said load for controlling said heat source.

5. A thermal control system comprising an electrical utilization circuit, electricity generating means connected to said utilization circuit including a germanium member having a positive type germanium control characteristic at temperatures below a predetermined inversion temperature and having an intrinsic type germanium control characteristic at temperatures above said inversion temperature, said generating means providing electricity having one polarity when said member has said positive type characteristic and having an opposite polarity when said member has said intrinsic type characteristic, asymmetrically conductive means in series circuit relation with said member and said utilization circuit, and means responsive to said utilization circuit for heating at least a portion of said member.

6. A thermal control system comprising an electrical utilization circuit responsive to electricity having one polarity only, voltage generating means comprising a thermosensitive element including a P-type germanium member adapted to be heated by an external heat source and connected in circuit relation with said utilization circuit, said thermosensitive element supplying to said load an output voltage having one polarity when the temperature of said germanium member is below a predetermined inversion temperature and having an opposite polarity when the temperature of said member is above said inversion temperature, and means responsive to said utilization circuit for controlling said heat source.

7. A thermal control system comprising an electrical utilization circuit responsive to electricity having one polarity only, a thermosensitive element connected in circuit with said utilization circuit comprising an elongated rod of P-type germanium having thermocouple junctions at either end, and heating means responsive to said utilization circuit and located to heat one of said junctions to hotter temperatures than the other junction, said thermosensitive element generating a thermoelectric voltage that reverses polarity at temperatuers above a predetermined inversion temperature of said germanium rod.

8. A thermal control system comprising an electrical utilization circuit, a thermoelectric element comprising an elongated rod of a P-type germanium and thermocouple junctions at either end of said rod, said rod having a room temperature resistivity between 40 and .002 ohm centimeters and having an inversion temperature to intrinsic germanium thermoelectric characteristic between 50 and 700° C., heating means responsive to said utilization circuit and located to heat one of said junctions to hotter temperatures than the other junction, and a rectifier connected in series with said thermoelectric element and said utilization circuit.

9. A thermal control system comprising an electrical load, a P-type germanium thermoelectric member adapted to be heated by an external heat source, a unidirectional conductor connected in circuit with said thermoelectric member and said load, said unidirectional conductor being polarized to block current generated by said thermoelectric member at room temperature, and means responsive to said load for controlling said heat source.

10. A thermal control system comprising an electrical load responsive to electricity having one polarity only, a Hall effect device including a P-type germanium Hall plate connected in circuit with said load, said Hall plate generating a Hall effect voltage having one polarity at temperatures below a predetermined inversion temperature between 50 and 700° C. and having an opposite polarity at temperatures above said inversion temperature, and heating means responsive to said load located to heat said Hall plate.

11. A thermal control system comprising an electrical load device, a Hall effect device including a Hall plate comprising a P-type germanium member having a room temperature resistivity between 40 and .002 ohm centimeters and having an inversion temperature to intrinsic Hall effect characteristic between 50 and 700° C., heating means responsive to said load located to heat said Hall plate, and unidirectional conducting means in series circuit relation with said load and said Hall plate to supply to said load an output Hall effect voltage having one polarity only to control said heating means.

12. A thermal control system comprising an electrical load energizable by electricity having one polarity only, a Hall effect device adapted to be heated by an external heat source and including a P-type germanium thermosensitive Hall plate having output Hall electrodes connected to said load, said Hall plate being connected to generate between said electrodes an output voltage having a non-energizing polarity for said load at room temperature but having an energizing polarity for said load at temperatures above an elevated inversion temperature, and means responsive to said energized load for controlling said external heat source.

13. A thermal control system comprising an electrical load, a source of unidirectional current, an asymmetrically conductive device connected in series with said load and said current source, said asymmetrically conductive device comprising a P-type germanium member of high resistivity between 2 and 40 ohm centimeters and a metal electrode in substantially punctiform contact with said member, and load controlled heating means for heating said member.

14. A thermal control system comprising an electrical load, a source of unidirectional current, a thermosensitive element comprising a P-type germanium point-contact rectifier adapted to be heated by an external heat source connected in series with said load and said current source in a current blocking dircetion at room temperature, said rectifier passing substantial current to energize said load only at temperatures above a predetermined elevated temperature between 50 and 150° C., and means responsive to said load circuit for controlling said external heat source.

15. A thermal system for controlling a polarity sensitive electrical load comprising, electricity generating means comprising a thermosensitive element adapted to be heated by an external heat source including a P-type germanium member having an electrical control characteristic of one polarity at room temperature and of an opposite polarity at temperatures above an elevated temperature, said member being adapted to be connected in circuit with said load to control the polarity of electricity supplied to said load in accord with the polarity of said control characteristic of said member, and means responsive to said load to control said heat source.

16. A thermal system for controlling a polarity sensitive electrical load comprising, a voltage generating means including a P-type germanium member adapted to be connected in circuit with said load, and means responsive to said load for heating said member, said generating means providing an output voltage having one polarity when the temperature of said member is below a predetermined inversion temperature and having an opposite polarity when the temperature of said member is above said inversion temperature.

17. A thermal system for controlling an electrical load responsive to voltage having one polarity only comprising a thermosensitive element adapted to be connected in circuit with said load comprising an elongated rod of P-type germanium having thermocouple junctions at either end, and heating means located to heat one of said junctions to hotter temperatures than the other junction, said thermosensitive element generating a thermoelectric voltage that reverses polarity at temperatures above a predetermined inversion temperature of said germanium rod.

18. A thermal system for controlling an electrical load responsive to voltage having one polarity only comprising, a Hall effect device including a P-type germanium Hall plate adapted to be connected in circuit with said load, said Hall plate generating a Hall effect voltage having one polarity at temperatures below a predetermined inversion temperature between 50 and 700° C. and having an opposite polarity at temperatures above said inversion temperature, and heating means located to heat said Hall plate.

19. A system for controlling an electrical load comprising a source of unidirectional current and a thermosensitive element comprising a P-type germanium point-contact rectifier adapted to be connected in series with the load and said current source in a current blocking direction at room temperature, said rectifier passing substantial current to energize said load only at temperatures above a predetermined elevated temperature between 50 and 150° C.

References Cited in the file of this patent

UNITED STATES PATENTS

| Number | Name | Date |
|---|---|---|
| 2,464,807 | Hansen, Jr. | Mar. 22, 1949 |
| 2,535,303 | Lewis | Dec. 26, 1950 |
| 2,560,606 | Shive | July 17, 1951 |
| 2,569,345 | Shea | Sept. 25, 1951 |
| 2,576,026 | Meacham | Nov. 20, 1951 |
| 2,585,545 | Gannett | Feb. 12, 1952 |
| 2,588,254 | Lark-Horovitz | Mar. 4, 1952 |
| 2,589,704 | Kirkpatrick et al. | Mar. 18, 1952 |

OTHER REFERENCES

The Physical Review, Bidwell, 2nd series, vol. XIX, No. 5; pp. 447–455.

The Transactor; Bell Telephone Laboratories, Inc., New York, New York (Copyright 1951); (pp. 98–101; 124–125).